United States Patent
Jeffryes

(10) Patent No.: US 10,400,522 B2
(45) Date of Patent: Sep. 3, 2019

(54) DRILL STRING WITH BOTTOM HOLE ASSEMBLY TRANSITION SECTION HAVING INCREASING EXTERNAL DIAMETER AND METHOD OF USE

(71) Applicant: Schlumberger Technology Corporation, Sugar Land, TX (US)

(72) Inventor: Benjamin P. Jeffryes, Histon (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 54 days.

(21) Appl. No.: 15/038,002

(22) PCT Filed: Nov. 20, 2014

(86) PCT No.: PCT/US2014/066600
§ 371 (c)(1),
(2) Date: May 19, 2016

(87) PCT Pub. No.: WO2015/077448
PCT Pub. Date: May 28, 2015

(65) Prior Publication Data
US 2016/0290065 A1 Oct. 6, 2016

Related U.S. Application Data

(60) Provisional application No. 61/906,763, filed on Nov. 20, 2013.

(51) Int. Cl.
E21B 17/07 (2006.01)
E21B 17/16 (2006.01)
(Continued)

(52) U.S. Cl.
CPC .............. *E21B 17/07* (2013.01); *E21B 17/00* (2013.01); *E21B 17/16* (2013.01); *G01V 11/002* (2013.01); *E21B 4/00* (2013.01); *E21B 10/00* (2013.01)

(58) Field of Classification Search
CPC ....... G01V 11/002; E21B 17/07; E21B 17/00; E21B 17/16; E21B 4/00; E21B 10/00
See application file for complete search history.

(56) References Cited

U.S. PATENT DOCUMENTS

| 5,128,901 A | 7/1992 | Drumheller |
| 6,915,875 B2 | 7/2005 | Dubinsky et al. |

(Continued)

FOREIGN PATENT DOCUMENTS

| DE | 2518493 A1 | 11/1976 |
| WO | 2015077448 A1 | 5/2015 |

OTHER PUBLICATIONS

International Search Report and the Written Opinion for International Application No. PCT/US2014/066600 dated Mar. 5, 2015.
(Continued)

*Primary Examiner* — David J Bagnell
*Assistant Examiner* — Yanick A Akaragwe

(57) ABSTRACT

A drillstring comprising a length of drillpipes and a bottomhole assembly disposed at a downhole end of the length of drillpipes. The bottomhole assembly comprises a transition section proximal to the end of the length of drillpipes to reduce vibration of the bottomhole assembly during drilling. The transition section varies gradually in acoustic impedance between the acoustic impedance of the drillstring above the transition section and the acoustic impedance of the bottomhole assembly below the transition section. The transition section forms at least thirty percent (30%) of the total length of the bottomhole assembly.

9 Claims, 6 Drawing Sheets

(51) Int. Cl.
  *G01V 11/00* (2006.01)
  *E21B 17/00* (2006.01)
  *E21B 4/00* (2006.01)
  *E21B 10/00* (2006.01)

(56) References Cited

U.S. PATENT DOCUMENTS

| | | |
|---|---|---|
| 2002/0080682 A1 | 6/2002 | Meehan |
| 2010/0157741 A1 | 6/2010 | Drumheller et al. |
| 2010/0195441 A1 | 8/2010 | Camwell et al. |
| 2010/0208552 A1 | 8/2010 | Camwell et al. |
| 2010/0258352 A1 | 10/2010 | Aldraihem et al. |
| 2015/0090495 A1* | 4/2015 | McGinnis ............... E21B 47/01 175/40 |

OTHER PUBLICATIONS

Supplementary European Search Report for corresponding European Application Serial No. 14863279.7, dated Nov. 11, 2016, 3 pages.

European Office Action for corresponding European Application Serial No. 14863279.7, dated Dec. 14, 2016, 8 pages.

* cited by examiner

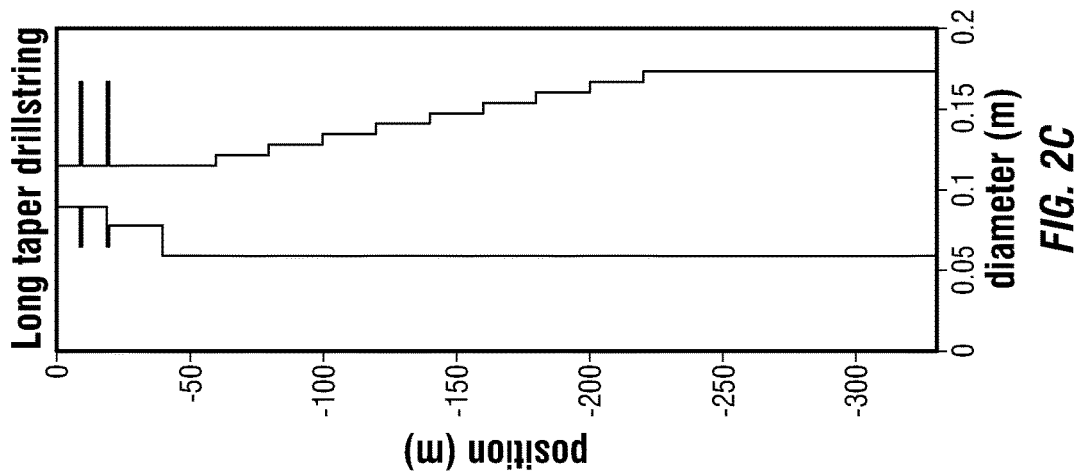
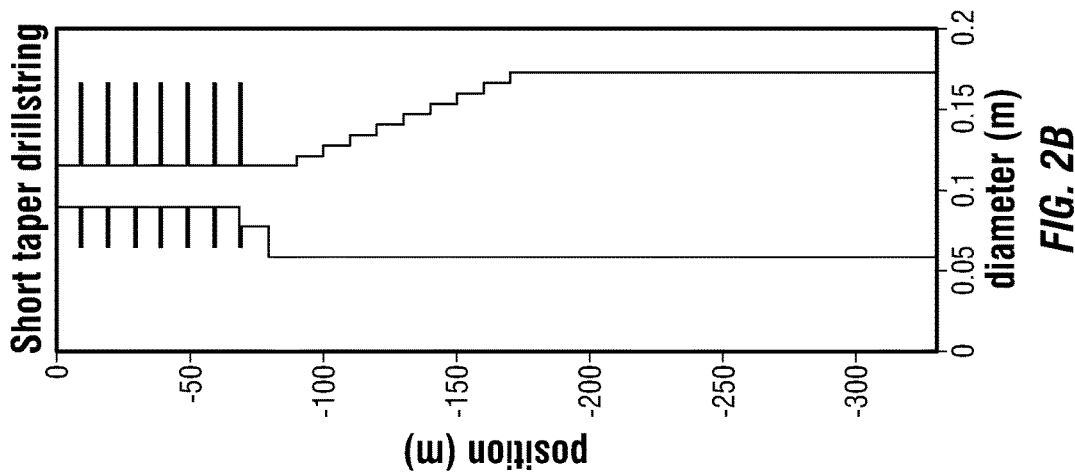
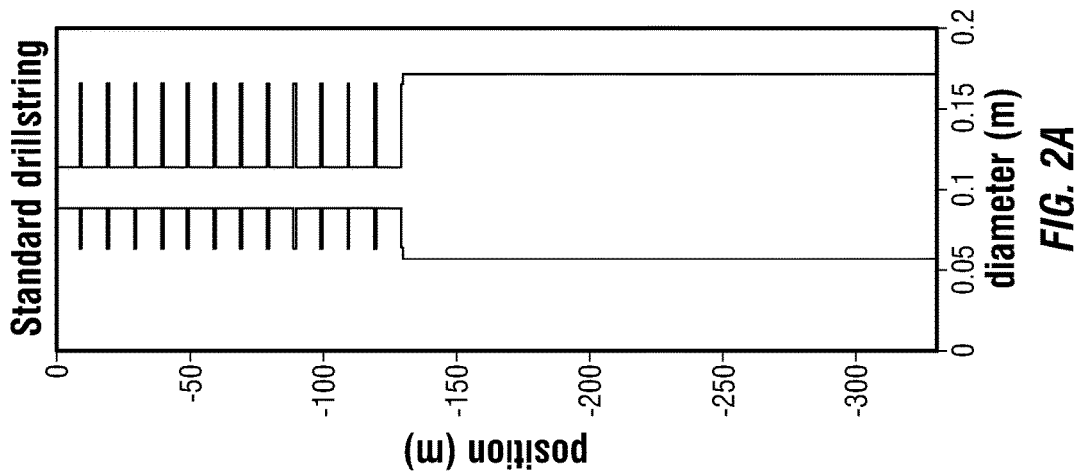

DRILL STRING WITH BOTTOM HOLE ASSEMBLY TRANSITION SECTION HAVING INCREASING EXTERNAL DIAMETER AND METHOD OF USE

BACKGROUND

In the petroleum industry, boreholes are drilled through earth formations by drilling systems so that hydrocarbons can be extracted from subterranean reservoirs. The drilling system for such drilling of operations comprises a drillstring that extends from the surface down to the bottom of the borehole.

FIG. 1 illustrates an example of a drilling system for operation at a well-site to drill a borehole through an earth formation. The well-site can be located onshore or offshore. In this system, a borehole 311 is formed in subsurface formations by rotary drilling in a manner that is well known. Similar drilling systems can be used drilling boreholes in directional drilling, pilot hole drilling, casing drilling and/or the like.

A drillstring 312 formed from a length of drillpipes 360 and a bottomhole assembly (BHA) 300, is suspended within the borehole 311. The BHA includes a drill bit 305 at its lower end. The surface system includes a platform and derrick assembly 310 positioned over the borehole 311, the assembly 310 including a rotary table 316, kelly 317, hook 318 and rotary swivel 319. The drillstring 312 is rotated by the rotary table 316, energized by means not shown, which engages the kelly 317 at the upper end of the drillstring. The drillstring 312 is suspended from a hook 318, attached to a traveling block (also not shown), through the kelly 317 and the rotary swivel 319 which permits rotation of the drillstring relative to the hook. As is well known, a top drive system could alternatively be used to rotate the drillstring 312 in the borehole and, thus rotate the drill bit 305 against a face of the earth formation at the bottom of the borehole.

In the example, the surface system further includes drilling fluid or mud 326 stored in a pit 327 formed at the well site. A pump 329 delivers the drilling fluid 326 to the interior of the drillstring 312 via a port in the swivel 319, causing the drilling fluid to flow downwardly through the drillstring 312 as indicated by the directional arrow 308. The drilling fluid exits the drillstring 312 via ports in the drill bit 305, and then circulates upwardly through the annulus region between the outside of the drillstring and the wall of the borehole, as indicated by the directional arrows 309. In this well-known manner, the drilling fluid lubricates the drill bit 305 and carries formation cuttings up to the surface as it is returned to the pit 327 for recirculation.

The BHA 300 may include a set of collars 363 for attaching to the drillstring 312, a logging-while-drilling (LWD) module 320, a measuring-while-drilling (MWD) module 330, a rotary-steerable system and motor, and drill bit 305.

The LWD module 320 may be housed in a special type of drill collar, as is known in the art, and can contain one or a plurality of known types of logging tools. It will also be understood that more than one LWD and/or MWD module can be employed, e.g. as represented at 320A. The LWD module may include capabilities for measuring, processing, and storing information, as well as for communicating with the surface equipment. The LWD module may include a fluid sampling device.

The MWD module 330 may also be housed in a special type of drill collar, as is known in the art, and can contain one or more devices for measuring characteristics of the drillstring and drill bit. The MWD tool may further includes an apparatus (not shown) for generating electrical power to the downhole system. This may typically include a mud turbine generator powered by the flow of the drilling fluid, it being understood that other power and/or battery systems may be employed. The MWD module may include one or more of the following types of measuring devices: a weight-on-bit measuring device, a torque measuring device, a vibration measuring device, a shock measuring device, a stick slip measuring device, a direction measuring device, a rotation speed measuring device, and an inclination measuring device.

Drilling an oil and/or gas well using the drilling system depicted in FIG. 1 may involve drilling a borehole of considerable length; boreholes are often up to several kilometres vertically and/or horizontally in length. As depicted, the drillstring comprises a drill bit at its lower end and lengths of drill pipe that are screwed/coupled together. A drive mechanism at the surface rotates the drill bit against a face of the earth formation to drill the borehole through the earth formation. The drilling mechanism may be a top drive, a rotary table or the like. In some drilling processes, such as directional drilling or the like, a downhole motor that may be powered by the drilling fluid circulating in the borehole or the like, may be used to drive the drill bit.

The drillstring undergoes complicated dynamic behaviour in the borehole during the drilling procedure, which complicated behaviour may include axial, lateral and torsional vibrations as well as frictional and vibrational interactions with the borehole. Simultaneous measurements of drilling rotation at the surface and at the bit have revealed that while the top of the drill string rotates with a constant angular velocity, the drill bit may rotate with varying angular velocities.

Strong rotational and axial resonances localized within the BHA can cause problems while drilling. Non-linear interactions, either at the bit or through wall contact, can lead to complicated high-amplitude vibrations at the resonant frequencies. Because most of the energy of these resonances is localized within the BHA, direct control from the surface can be difficult.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set.

In one embodiment of the present disclosure, the deleterious effects of the resonances described above may be mitigated. Accordingly in one embodiment, a drillstring is provided that includes a length of drillpipes and a bottomhole assembly at a downhole end of the length of drillpipes, where the bottomhole assembly includes a transition section proximal to the end of the length of drillpipes that is designed to reduce vibration of the bottomhole assembly during drilling. In the embodiment, the transition section varies gradually in acoustic impedance between the acoustic impedance of the drillstring above the transition section and the acoustic impedance of the bottomhole assembly below the transition section. Moreover, the transition section forms at least 30% of the total length of the bottomhole assembly.

Although the transition section may not eliminate resonances in the BHA, in embodiments of the present disclosure, the transition section can de-localize the resonances, so that the energy contained within the resonances is spread more widely throughout the drillstring.

This has the effect of allowing/causing attenuative effects along the drillstring to reduce the peak amplifications, and for shorter drillstrings, to allow the energy in the resonant frequencies to reach the surface, where they can be detected and potentially controlled.

In some embodiments, the transition section provides that should jarring be necessary to unstick the drillstring during a drilling procedure, and if the jar is not positioned within a section of the BHA with the same impedance as the position of the stuck-point, energy transmission from the jar to the stuck-point may be improved.

In some embodiments, the drillstring may have any one or, to the extent that they are compatible, any combination of the following optional features.

The acoustic impedance may be the impedance for rotational waves or for axial waves.

The acoustic impedance z may be a medium average impedance.

In general, in a conventional drilling system, the drillpipes have a smaller outer diameter than the BHA. In this disclosure the term drillpipes may be used to refer to a drillstring comprising drill pipe to which a bottomhole assembly is attached, where the drillstring and bottomhole assembly comprise parts of a drilling system for drilling a borehole through an earth formation. In order to gradually vary the acoustic impedance in accordance with an embodiment of the present disclosure, the transition section may increase in outer diameter with distance from the end of the length of drillpipes. Similarly, in a conventional drilling system, the drillpipes generally have a larger inner diameter than the BHA. Thus, in some embodiments, the transition section may decrease in inner diameter with distance from the end of the length of drillpipes. Additionally or alternatively, another option for gradually varying the acoustic impedance of the transition section is to vary the material of the section with distance from the end of the length of drillpipes.

In some embodiments, a combination of one or more of: increasing the outer diameter of the transition section from the top of the transition section at the drillpipes down the BHA, decreasing the inner diameter of the transition section from the top of the transition section at the drillpipes down the BHA and varying the material comprising the transition section from the top of the transition section at the drillpipes down the BHA.

In an embodiment of the present disclosure, the start of the transition section may be a portion of the BHA at the downhole end of the length of drillpipes. In some embodiments, the transition section may be a section that is disposed between the bottom of the drillpipes and the top of the BHA.

In some embodiments, a longer transition section may eliminate more of the vibration modes of the BHA, including the fundamental. Accordingly, in some embodiments the transition section may form at least 40, 50, 60% or more of the total length of the bottomhole assembly.

In some embodiments, the acoustic impedance of the transition section may vary linearly with distance from the end of the length of drillpipes, for example this linear variation may be provided by increasing the outer-diameter of the transition section linearly with distance along the transition section. Such a linear variation, in accordance with some aspects of the present disclosure, may be effective at de-localizing BHA resonances. However, in other embodiments, the transition section may be configured so that it matches more closely to a theoretically ideal form. Thus, in such embodiments, the acoustic impedance of the transition section may vary with distance from the end of the length of drillpipes according to the equation:

$$\log(z) = \log(z_0) + \frac{\log(z_1) - \log(z_0)}{x_1 - x_0}(x - x_0)$$

where: x is distance along the drillstring (which is comprised of a length of drillpipes), $x_0$ is the location of the end of the transition section proximal to the end of the length of drillpipes, $x_1$ is the location of the end of the transition section distal from the end of the length of drillpipes, z is the acoustic impedance of the transition section, $z_0$ is the acoustic impedance of the drillstring above the transition section, and $z_1$ is the acoustic impedance of the BHA below the transition section.

In an embodiment of the present invention, the transition section may be formed from a length of separably joinable elements (e.g. drilling collars or the like). It can thus be assembled as needed on-site. Additionally, the transition section can be custom made to provide for tailoring the transition section to the properties of the BHA being used, the properties of the drillstring being used, the properties of the formation being drilled, the properties of the drilling system, the properties of the operation parameters of the drilling system and/or the like. In some aspects, a software program or the like may be used to process optimum, preferable dimensions/properties for the transition section for the drilling procedure to be or being performed.

In some aspects, the acoustic impedance of the transition section may increase in a step-wise fashion at joints between the elements, e.g. by way of discrete steps in the outer diameter in the outer diameter. Having such discrete steps allows the separate elements to be formed as simple tubes, each of constant inner and outer diameters, and does not significantly reduce the ability of the transition section to de-localize BHA resonances. In some aspects, the elements may be configured, however, so that the acoustic impedance transition (for rotational waves and/or for axial waves) between any two neighbouring elements is such that the ratio of the larger impedance to the smaller impedance at the transition is in the range of between 1 and 1.28. In other aspects, each element of the transition section may be formed so that its acoustic impedance varies smoothly with distance. For example, the outer diameter of each element may increase smoothly with distance, thereby forming a smooth outer surface of the transition section.

A further aspect of the present invention provides a set of separably joinable elements (e.g. collars) for forming the transition section of the first aspect.

A further aspect of the present invention provides the use of the drillstring according to first aspect for drilling a borehole.

BRIEF DESCRIPTION OF THE DRAWINGS

Embodiments of the disclosure will now be described by way of example with reference to the accompanying drawings in which:

FIG. 2 shows, for the bottom 330 m of three drillstrings (a)-(c), respective graphs of vertical distance plotted against inner and outer drillstring diameters;

Figure 1:
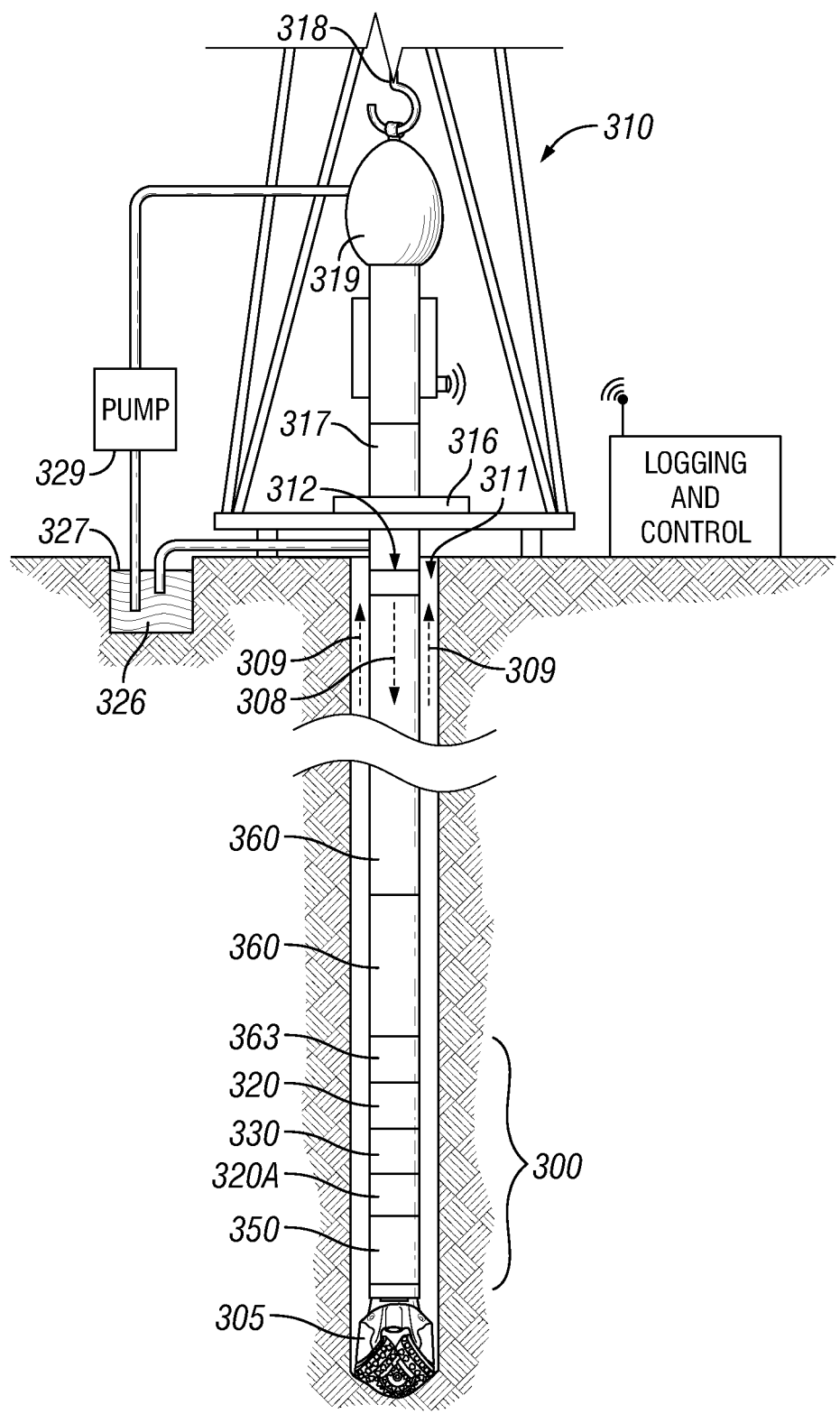
FIG. 1 shows schematically an example of a drilling system for operation at a well-site to drill a borehole through an earth formation.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention, it being understood that various changes may be made in the function and arrangement of elements without departing from the scope of the invention.

Specific details are given in the following description to provide a thorough understanding of the embodiments. However, it will be understood by one of ordinary skill in the art that embodiments maybe practiced without these specific details. For example, well-known circuits, processes, algorithms, structures, and techniques may be shown without unnecessary detail in order to avoid obscuring the embodiments.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to, portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

FIG. 2(a) shows a graph of vertical distance for the bottom 330 m of a conventional 3200 m drillstring plotted against the inner and outer drillstring diameters, the drillstring comprising a length of one hundred 4.5 inch (114 mm) drillpipes, terminated by a BHA formed of twenty 6.75 inch (171 mm) drill collars. Horizontal lines on the graph indicate the positions of joints between drillpipes.

Figure 3:
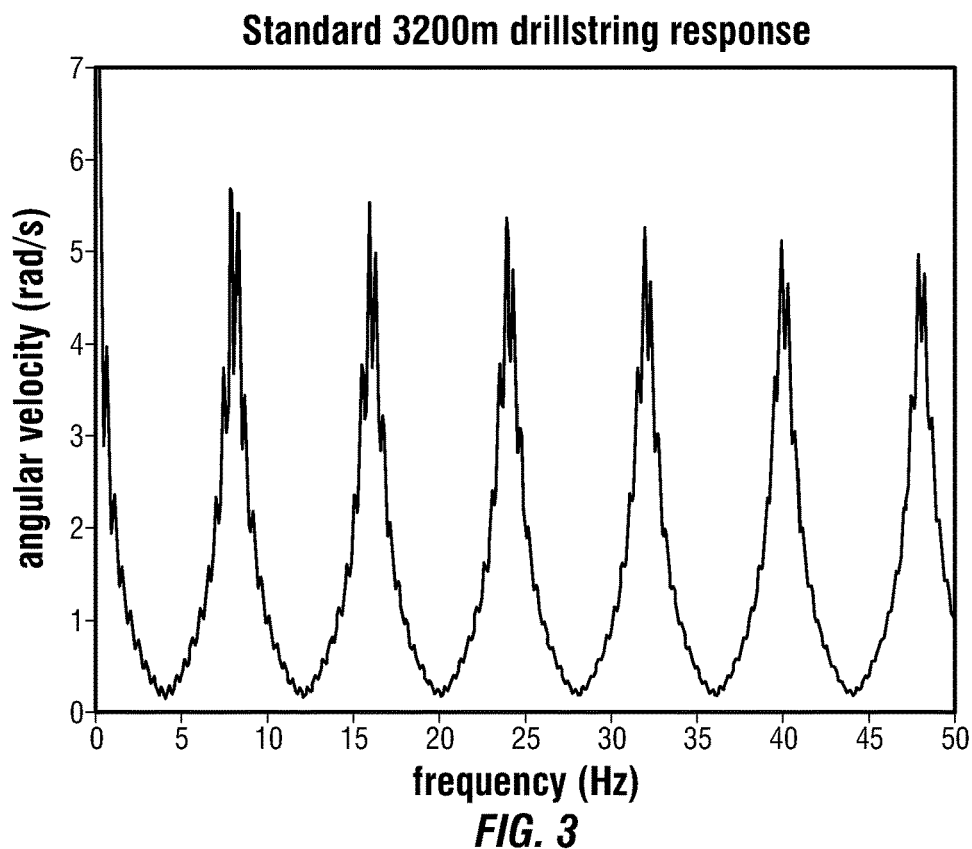
FIG. 3 shows the theoretical rotation velocity response of the drillstring of FIG. 2(a) to a 1 kNm torque excitation at its bottomhole end, measured at that end.

FIG. 3 shows the theoretical rotation velocity response (angular velocity in rad/s plotted against frequency in Hz) of the drillstring of FIG. 2(a) to a 1 kNm torque excitation at the bottomhole end, measured at that end. The response has close-spaced resonances, about 0.4 Hz apart, but the spectrum is dominated by the resonances spaced about 8 Hz apart, the energy of these resonances being predominantly localized within the BHA.

Figure 4:
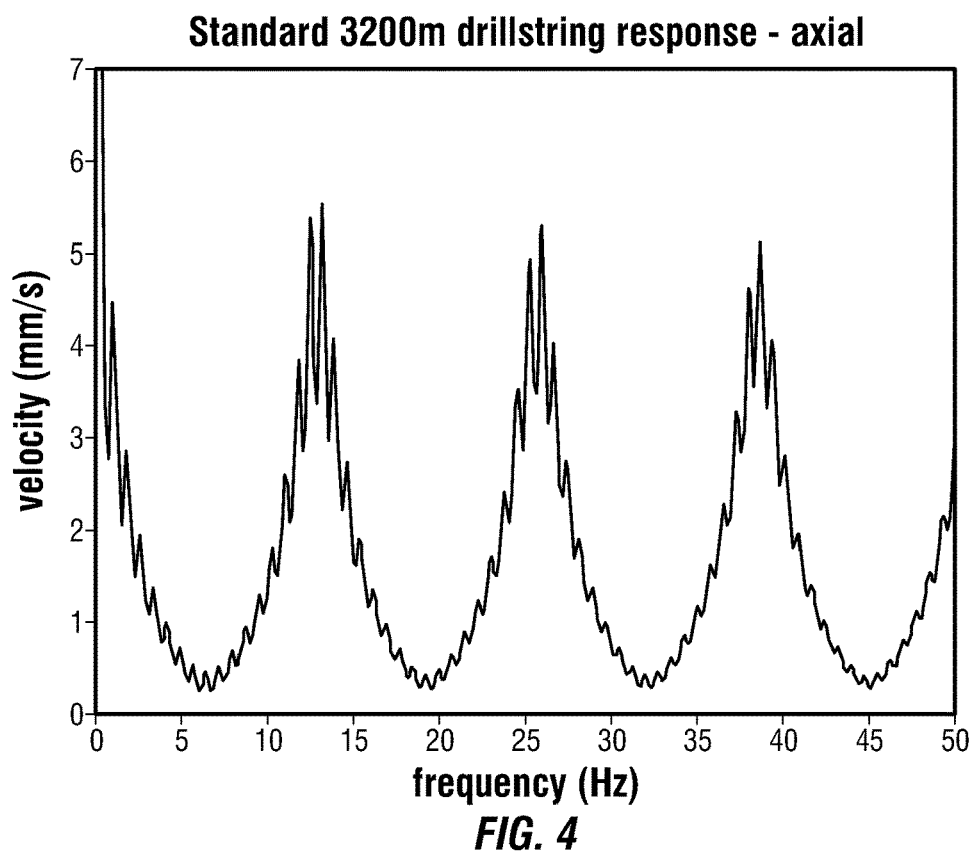
FIG. 4 shows the theoretical axial velocity response of the drillstring of FIG. 2(a) to a 1 kN axial force excitation at its bottomhole end, measured at that end.

FIG. 4 shows the theoretical axial velocity response (velocity in mm/s plotted against frequency in Hz) of the drillstring of FIG. 2(a) to a 1 kN axial force excitation at the bottomhole end, measured at that end. The difference in characteristic frequencies relative to the torque excitation of FIG. 3 is due to the higher speed of propagation for axial waves compared to rotatational waves, and the lower peak height is due to the impedance contrast for axial waves (related to the change in cross-sectional area of the components) being less than the impedance contrast for rotational waves (related to the change in moment-of-inertia of the components).

According to the present invention, these localized resonances may be reduced or removed by introducing a transition zone between the length of drillpipes and the BHA. The transition zone can be provided by a section of the BHA which gradually varies in acoustic impedance from the end of the length of drillpipes. For example, to achieve such variation, the outer diameter of the transition section may increase with distance. In the transition section, changes in cross-section between individual drillstring components can be kept small.

Thus FIG. 2(b) shows a graph of vertical distance for the bottom 330 m of a 3200 m drillstring plotted against the inner and outer drillstring diameters. In this case, the drillstring comprises a length of ninety four 4.5 inch (114 mm) drillpipes, terminated by a BHA. From the bottomhole end upwards, the BHA is formed of:

sixteen 6.75 inch (171 mm) drill collars,
a length of 10 m long collars, each of which has an inner diameter of 2.25 inches (57 mm) and an outer diameter 0.25 inches less than the one below; and
a tubular with an outer diameter of 4.5 inches and an inner diameter of 3 inches (76 mm), the tubular helping to avoid too large a reflection coefficient at the top of the BHA at the transition to relatively large inner diameter drillpipe.

The length of 10 m long collars and the tubular together form the transition section of the BHA.

Figure 5:
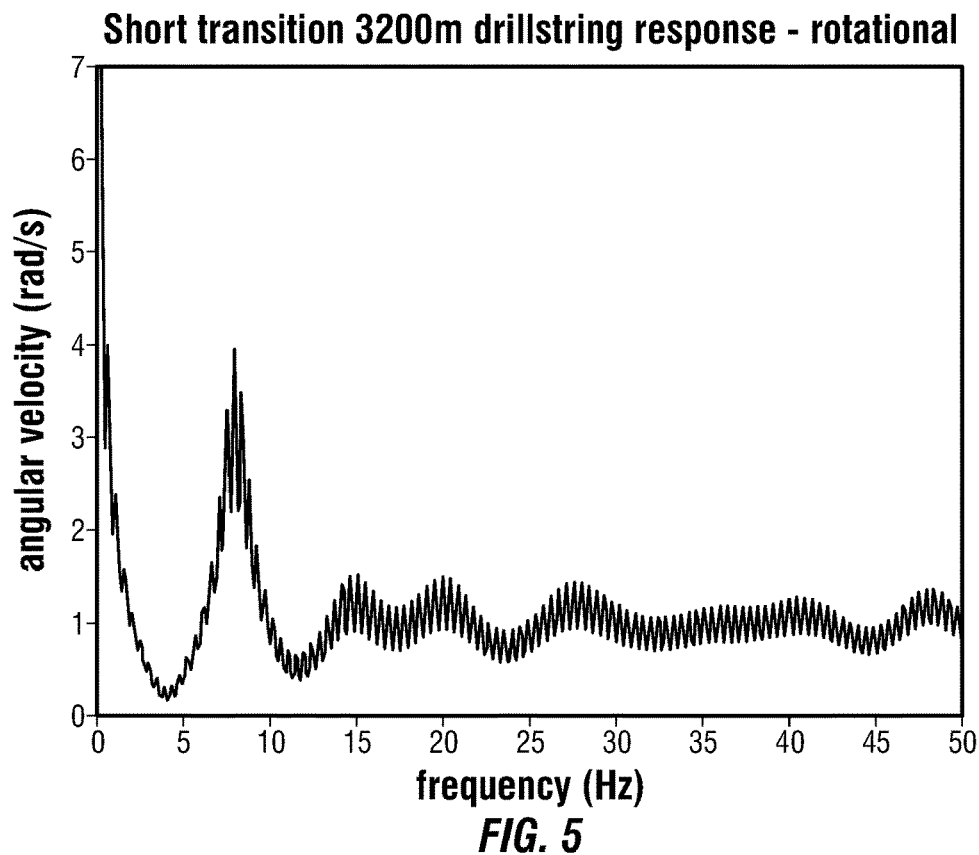
FIG. 5 shows the theoretical rotation velocity response of the drillstring of FIG. 2(b) to a 1 kNm torque excitation at its bottomhole end, measured at that end.
Figure 6:
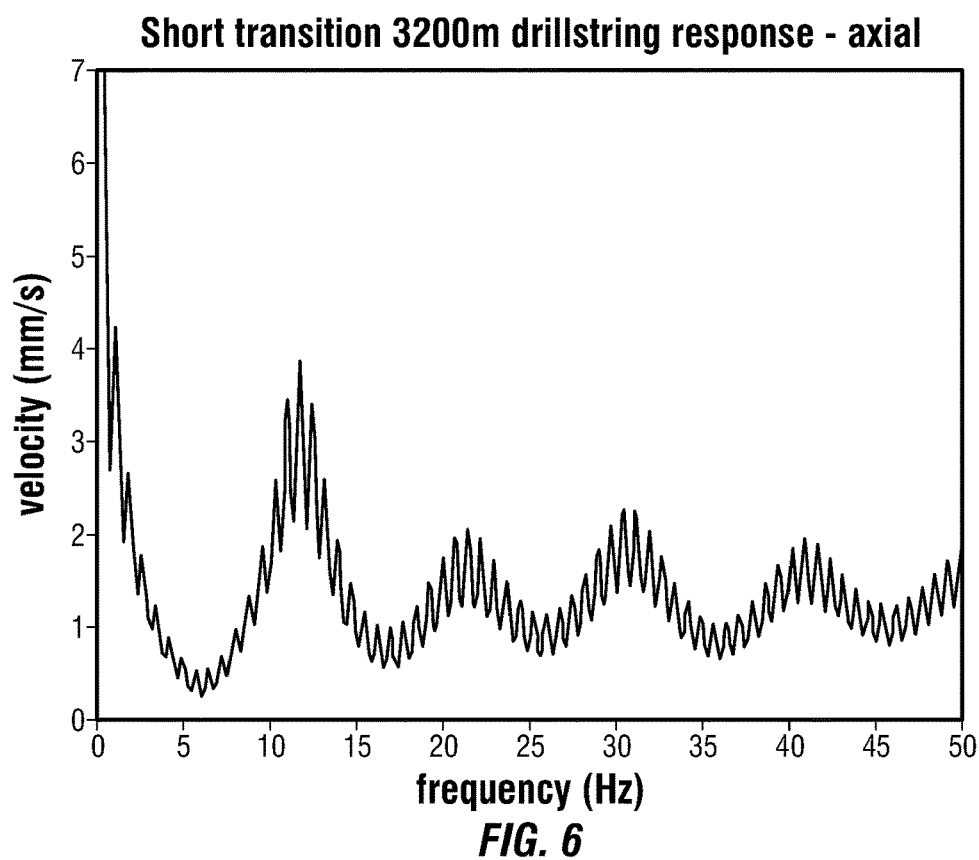
FIG. 6 shows the theoretical axial velocity response of the drillstring of FIG. 2(b) to a 1 kN axial force excitation at its bottomhole end, measured at that end.

FIGS. 5 and 6 show the theoretical rotation and axial velocity responses of the drillstring of FIG. 2(b) to the respective excitations of FIGS. 3 and 4. Compared to the conventional drillstring of FIG. 2(a), the BHA resonances have mostly disappeared.

Increasing the length of the transition section can delocalize the resonances still further. Thus FIG. 2(c) shows a graph of vertical distance for the bottom 330 m of a 3200 m drillstring plotted against the inner and outer drillstring diameters. In this case, the drillstring comprises a length of eighty nine 4.5 inch (114 mm) drillpipes, terminated by a BHA. From the bottomhole end upwards, the BHA is formed of:

eleven 6.75 inch (171 mm) drill collars
a length of 10 m long collars arranged in neighbouring pairs, each pair having an inner diameter of 2.25 inches (57 mm) and an outer diameter 0.25 inches less than the pair below, and
a pair of tubulars (which again help to avoid too large a reflection coefficient at the top of the BHA) with an outer diameter of 4.5 inches and an inner diameter of 3 inches (76 mm).

The length of 10 m long collars and the tubulars together form the transition section of the BHA.

Figure 7:
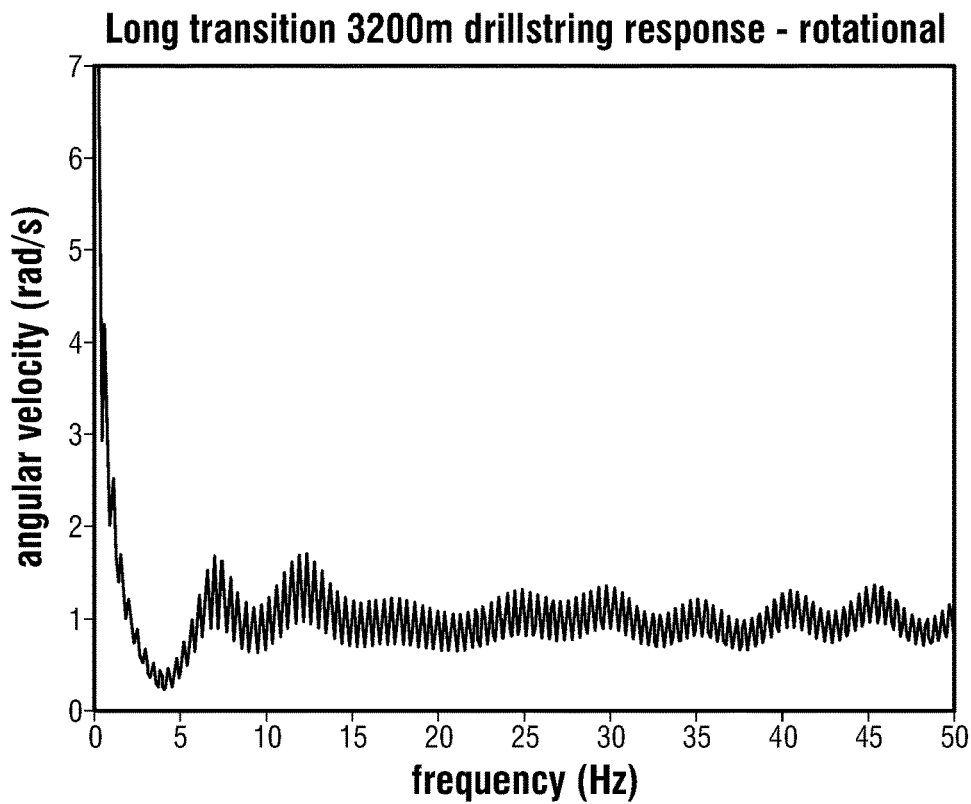
FIG. 7 shows the theoretical rotation velocity response of the drillstring of FIG. 2(c) to a 1 kNm torque excitation at its bottomhole end, measured at that end.
Figure 8:
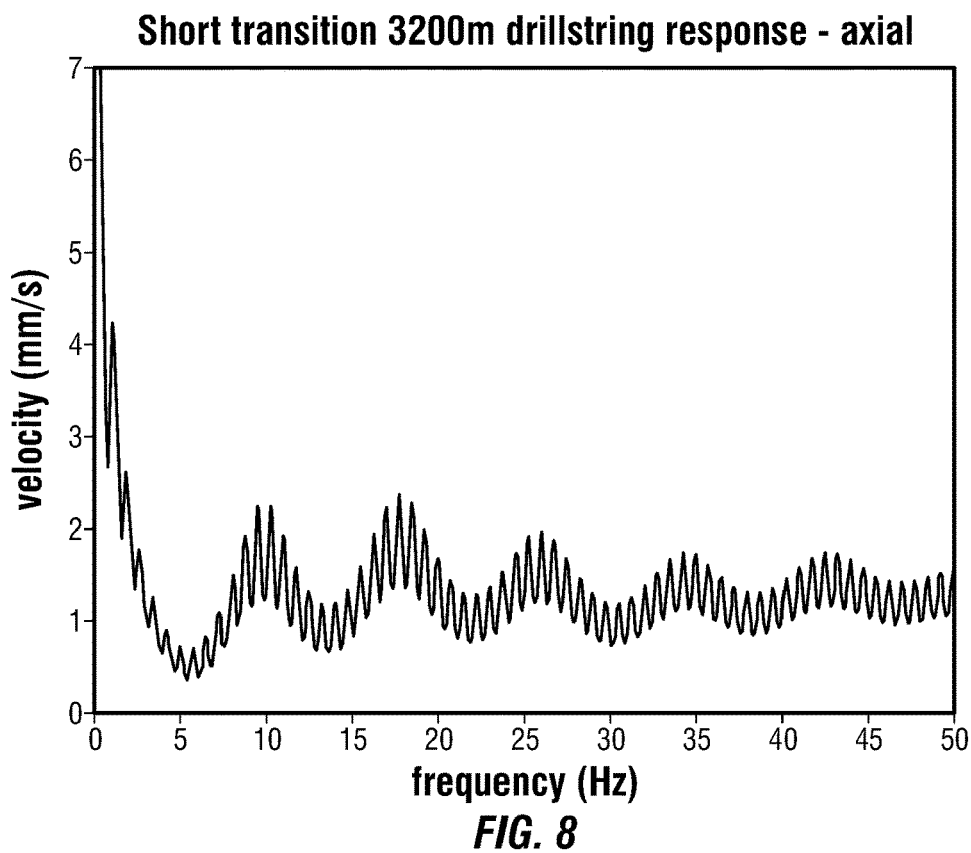
FIG. 8 shows the theoretical axial velocity response of the drillstring of FIG. 2(c) to a 1 kN axial force excitation at its bottomhole end, measured at that end.

FIGS. 7 and 8 show the theoretical rotation and axial velocity responses of the drillstring of FIG. 2(c) to the respective excitations of FIGS. 3 and 4. For this drillstring, there are now no significant BHA resonances. In particular, along-string attenuation is enough to remove almost all of the resonant amplification above 5 Hz.

Figure 9:
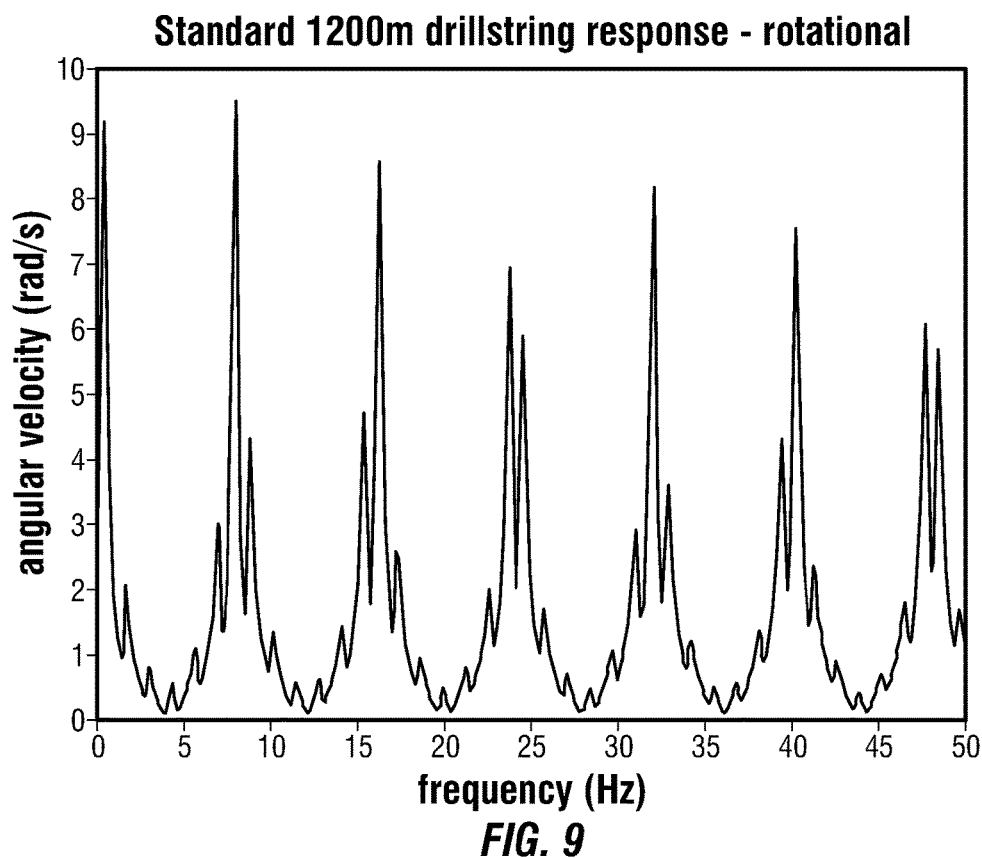
FIG. 9 shows the theoretical rotational response of the BHA shown in FIG. 2(a) to a 1 kNm torque excitation at its bottomhole end, measured at that end, except as part of a 1200 m drillstring.
Figure 10:
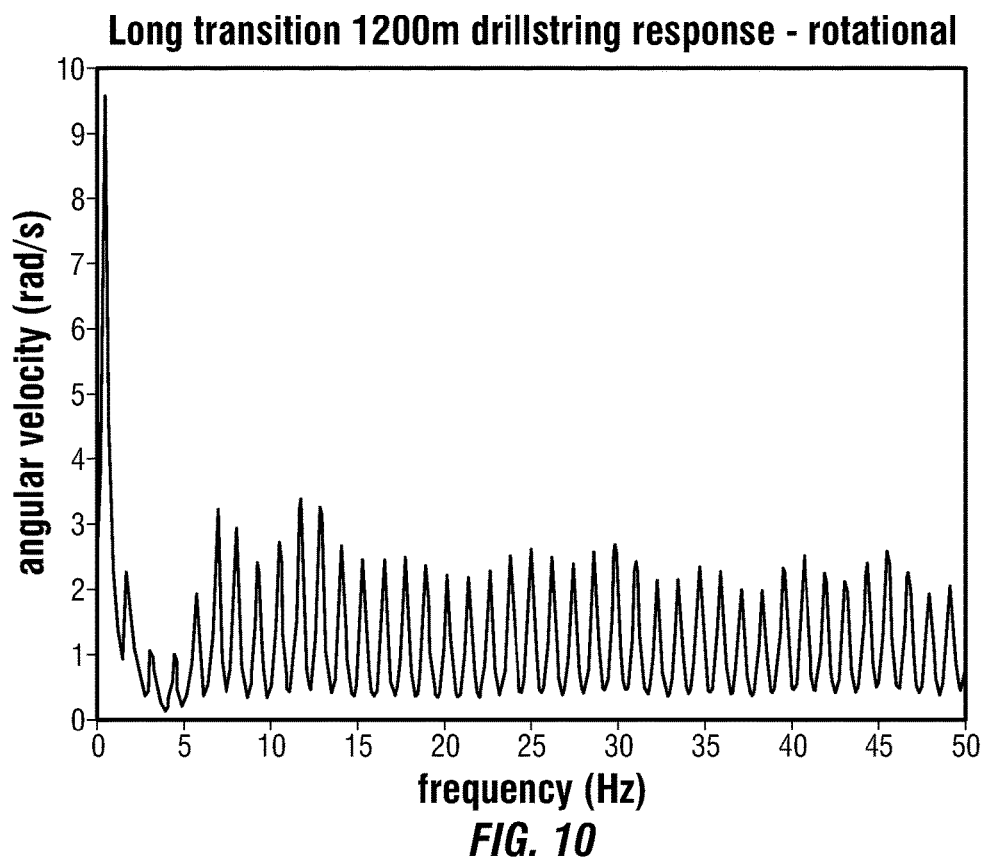
FIG. 10 shows the theoretical rotational response of the BHA shown in FIG. 2(c) to a 1 kNm torque excitation at its bottomhole end, measured at that end, except as part of a 1200 m drillstring.

FIGS. 9 and 10 show the rotational response of the same BHA as in FIGS. 2(a) and (c), except as part of a 1200 m drillstring. For this shorter drillstring, the full-drillstring resonances are more prominent, even with the transition section BHA (FIG. 10), but are still much reduced in amplitude compared to the conventional BHA (FIG. 9).

For an effective transition section, which eliminates all modes including the BHA fundamental, the transition length is preferably at least approximately twice the length of the un-tapered part of the BHA between the transition section and bit. Since most of the transition section can be formed of heavy, relatively stiff, components, this does not necessarily result in a tripling of the length of the BHA, but rather, as in the examples shown, a 50% increase, as the un-tapered section can itself be reduced in length by about 50%.

In drilling procedures where operational requirements necessitate a given length of essentially constant cross-section BHA (for example, in order to include certain downhole tools, sensors or the like on the BHA), in some embodiments of the present invention, the transition section may be made twice as long, or longer than the constant cross-section portion of the BHA to remove BHA resonance.

As shown in FIGS. 5 and 6, even a short transition section can be effective in reducing resonances, and can also be effective in allowing the higher-frequency energy from a jar to transition in and out of the BHA. However, a short transition section will not generally eliminate the lowest BHA resonance. If the transition section is between 50% and 200% of the length of the remaining, essentially constant cross-section, portion of the BHA, then the height of the first resonance can be concomitantly reduced.

In aspects of the present invention, a preferred acoustic impedance profile of the transition section between high and low acoustic impedance is log-linear, i.e. if the acoustic impedance below $x=x_1$ is $z_1$ and the acoustic impedance above $x=x_0$ is $z_0$ then between $x_0$ and $x_1$ the impedance, in an embodiment of the present invention, may follow:

$$\log(z) = \log(z_0) + \frac{\log(z_1) - \log(z_0)}{x_1 - x_0}(x - x_0)$$

To calculate the acoustic impedance above and below the transition section, rather than using the impedances at the exact locations $x_0$ and $x_1$, in an embodiment of the present invention, the equivalent medium average impedance may be used for an extended distance, which is approximately equal to the length of BHA below the transition section.

The equivalent medium average impedance is given by:

$$z = \frac{\sqrt{\langle \rho X \rangle}}{\sqrt{\langle \frac{1}{MX} \rangle}}$$

where $\rho$ is the density, X is the cross-sectional area for axial waves and is the sectional moment-of-inertia for rotational waves, M is the Young's modulus for axial waves and is the shear modulus for rotational waves, and angular brackets denote the spatial average.

However, since the acoustic impedance for rotational waves is proportional to the cross-sectional moment of inertia, and for axial waves is proportional to the cross-sectional area, it is not possible to achieve a log-linear profile for both kinds of vibration simultaneously. Also, it is may be convenient to use BHA elements (e.g. collars or the like) to form the transition section, which BHA elements are of reasonable length, each of which has an essentially constant cross-sectional area (and moment of inertia) along its length.

Thus, in practice the transition section may change in inner and/or outer diameter in a step-wise fashion at joints between the elements which make up the section, rather than having a smoothly varying inner/outer surface. Further the overall outer diameter of the transition section may simply increase linearly with distance. In general, in embodiments of the present invention, any gradual transition of the transition section may achieve good BHA resonance reduction. For example, in an embodiment of the present invention, if all, or at least most, of the impedance transitions within and at the ends of the transition section are such that the ratio of the larger impedance to the smaller impedance (i.e. the reflection coefficient) at any given transition is between 1 and 1.28, then the maximum reflection coefficient present in the transition is less than 0.125 in magnitude, and large resonances can be avoided.

In the example of FIG. 2(c), each constant-impedance sub-section of the transition section is two collars (20 m) long. If the total impedance contrast between the BHA below the transition section and the length of drillpipe were higher, then these sub-sections would have to be shorter to have a reflection coefficient between 1 and 1.28. However, it follows from the ideal log-linear relationship, that a doubling of the total impedance constrast only requires the total number of impedance transitions to increase from the eleven shown in FIG. 2(c) to fourteen in order to maintain their corresponding reflection coefficients at the same value.

Having a gradual variation in collar size in the transition section at the top of the BHA may have additional benefits in addition to reducing resonances localized in the BHA, amongst which are the following:

The avoidance of large changes in component sizes can reduce localized stress concentrations near the top of the BHA, and thus should also reduce the occurrence of fatigue-related component failures.

When removing the drillstring from high-angle wells, where a cuttings bed is present on the low-side of the hole, a sudden increase in drillstring outer diameter encourages the BHA to plough into the cuttings, creating a "bow-wave" of material which can impede the egress of the BHA from the hole, and potentially create a blockage to flow. Having only small variations in outer diameter allows the drillstring to largely ride over the cuttings bed, reducing the likelihood of blockage. Similarly, the BHA is less likely to lodge in key-seats.

While the principles of the disclosure have been described above in connection with specific apparatuses and methods, it is to be clearly understood that this description is made only by way of example and not as limitation on the scope of the invention.

What is claimed is:

1. A drillstring for drilling a borehole through an earth formation, comprising:
   a length of drillpipes; and
   a bottomhole assembly disposed at a downhole end of the length of drillpipes, the bottomhole assembly comprising a transition section proximal to the downhole end of the length of drillpipes, wherein:
      the transition section is configured to reduce vibration of the bottomhole assembly during drilling;
      the transition section varies gradually in acoustic impedance between the acoustic impedance of the drillstring above the transition section and the acoustic impedance of the bottomhole assembly below the transition section;
      the transition section comprises an upper tubular and a lower length of separably joinable elements;
      in order to gradually vary the acoustic impedance, the lower length of separably joinable elements increases in outer diameter in a step-wise fashion at each joint or each other joint, between the elements with distance from the downhole end of the length of drillpipes, such that the outer diameter of the lower length of separately joinable elements increases linearly along the transition section with distance from the downhole end of the length of drillpipes; and
      the transition section comprises at least 30% of a total length of the bottomhole assembly.

2. The drillstring of claim 1, wherein a start of the transition section is at the downhole end of the length of drillpipes.

3. The drillstring of claim 1, wherein the transition section forms at least 50% of the total length of the bottomhole assembly.

4. The drillstring of claim 1, wherein the acoustic impedance of the transition section varies with distance from the end of the length of drillpipes according to the equation:

$$\log(z) = \log(z_0) + \frac{\log(z_1) - \log(z_0)}{x_1 - x_0}(x - x_0)$$

where x is distance along the drillstring, $x_0$ is the location of the end of the transition section proximal to the end of the length of drillpipes, $x_1$ is the location of the end of the transition section distal from the end of the length of drillpipes, z is the acoustic impedance of the transition section, $z_0$ is the acoustic impedance of the drillstring above the transition section, and $z_1$ is the acoustic impedance of the bottomhole assembly below the transition section.

5. The drillstring of claim 1, wherein the acoustic impedance transition between any two neighboring elements is such that the ratio of the larger impedance to the smaller impedance at the transition is between about 1 and 1.28.

6. The drillstring of claim 1, wherein the outer diameter of each element increases smoothly with distance, to form a smooth outer surface of the transition section.

7. A method of drilling a borehole through an earth formation:
   rotating a drill bit on a downhole end of a bottomhole assembly to drill through the earth formation, wherein the bottomhole assembly is suspended in the borehole by a length of drillpipes; and
   using a transition section to reduce vibration of the bottomhole assembly during the drilling of the borehole, wherein:
      the transition section is disposed between the drillpipes and the bottomhole assembly; and
      the transition section comprises a tubular and a section of a plurality of cylindrical structures, the tubular having an internal that tapers between an internal diameter of a downhole end of the drillpipes proximal to the transition section and an internal diameter of the section of the plurality of cylindrical structures, and the section of the plurality of cylindrical structures having an external diameter that tapers between an external diameter of the downhole end of the drillpipes proximal to the transition section and an external diameter of the bottomhole assembly proximal to the transition section, wherein the external diameter of the one or more cylindrical structures linearly increases in a downhole direction at each joint or each other joint between the plurality of cylindrical structures, and wherein the transition section is at least as long as 30% of the length of the bottomhole assembly.

8. The method of claim 7, wherein at least one of the plurality of cylindrical structures of the transition section and a taper of the inner or outer diameters is determined using properties of the drillpipes and/or the bottomhole assembly.

9. The drillstring of claim 1, wherein the transition section is configured such that acoustic impedance of the transition section has an approximately log-linear profile wherein the impedance transition between any two neighboring elements is such that the ratio of the larger impedance to the smaller impedance at the transition is between about 1 and 1.28.

* * * * *